May 30, 1961 G. O. ECCLES 2,985,953
MANUFACTURE OF BLADES OF INTERNAL COMBUSTION TURBINE ENGINES
Filed Nov. 21, 1958 2 Sheets-Sheet 1

George Oswald Eccles
INVENTOR

BY Leech & Radue
ATTORNEYS

United States Patent Office 2,985,953
Patented May 30, 1961

2,985,953

MANUFACTURE OF BLADES OF INTERNAL COMBUSTION TURBINE ENGINES

George O. Eccles, Barrowford, England, assignor to Rolls-Royce Limited, Derby, England, a British company Filed Nov. 21, 1958, Ser. No. 775,638

Claims priority, application Great Britain Dec. 13, 1957

4 Claims. (Cl. 29—156.8)

This invention relates to the manufacture of blades, and particularly turbine blades for internal combustion turbine engines, from metals such as nickel-chrome alloys which are resistant to high temperatures.

The invention provides a method of manufacturing blades with integral root, blade profile and shroud portions, and heat exchange passages for cooling or heating fluid, extending axially through the blades.

According to the invention the method comprises the following steps:

(a) Producing a billet;

(b) Extruding in a die a solid aerofoil section at one end of the billet;

(c) Drilling blind holes axially in the non-extruded portion of the billet, the holes extending substantially to the plane of the junction of the extruded and non-extruded portions of the billet;

(d) Inserting a filler material such as mild steel into the holes;

(e) Extruding a further portion of the billet, adjacent the first extruded portion, in a die of greater cross-sectional area than the first die so as to leave the first extruded portion unaffected and to form an adjacent blade profile portion, again leaving an end portion of the billet non-extruded;

(f) Upsetting the first-extruded portion;

(g) Machining the upset first-extruded portion to form the root of the blade;

(h) Drilling holes axially through the first extruded portion to register with the blind holes and thereby form through passages;

(i) Machining the non-extruded end portion to form the blade shroud;

(j) Machining the blade profile portion to final shape; and (k) Removing the filler material.

By extruding initially a portion of the billet which is ultimately to form the root of the blade and then extruding, in a die of larger cross-section, the portion of the billet which is to form the profile portion of the blade, two advantages are obtained. Firstly a shoulder is formed between the two extruded portions and the shoulder provides a guide as to the depth to which blind holes should be drilled and consequently results in better control of hole depth after extrusion. The shoulder defines a plane to which the holes are initially drilled and throughout subsequent operations always defines the innermost ends of the holes as well as an easily locatable plane to which subsequent holes from the opposite direction may be drilled.

The root portion is ultimately formed by upsetting a solid (extruded) portion of the blade. Since the portion upset is solid i.e. it has no holes in it at this stage, no distortion of the holes is caused by the upsetting process. Also since the portion upset to form the root has previously been extruded, surface flaws will have been smoothed out by the extrusion and there will be a uniform surface in the final root portion to facilitate subsequent machinery.

Steps (a) and (b) may be carried out at the same time the billet and section being extruded from a slug for use.

If the blade is to be a twisted blade the twisting will be carried out between the steps (e) and (f) or it may be carried out as part of step (e) twisting taking place in the extrusion die.

Figure 11:
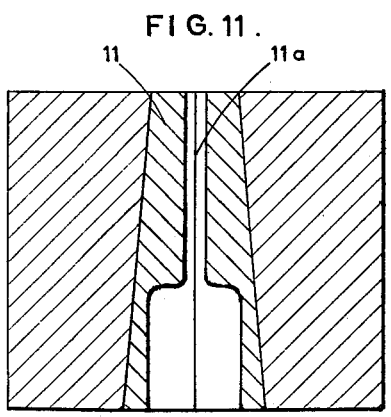
Figure 11 is a section through a die used for the first extrusion.

In manufacture of the blade a billet 10 is formed from a cut bar of nickel-chrome alloy by forging. The billet 10 is then extruded in a split die 11 having the cross-section shown in Figure 11 to produce an extruded end portion 12 and a non-extruded portion 13, the two portions being joined by a shoulder 14.

Preferably the steps of forming the billet 10 and extrusion of part of the billet to form the portion 12 would be combined in one operation.

Figure 1:
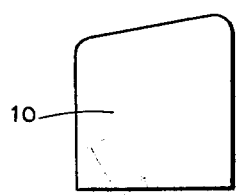
Figure 1 is an elevation of a billet.
Figure 2:
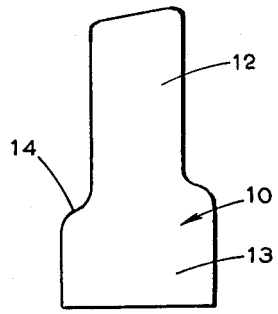
Figure 2 is an elevation of the billet after the first extrusion.
Figure 3:
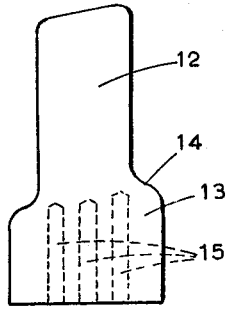
Figure 3 is an elevation of the partially-extruded billet with blind holes drilled in it.

Holes 15 are then drilled axially in the non-extruded portion 13, the holes terminating substantially in the plane of the shoulder 14 as shown in Figure 3, as previously explained.

Figure 12:
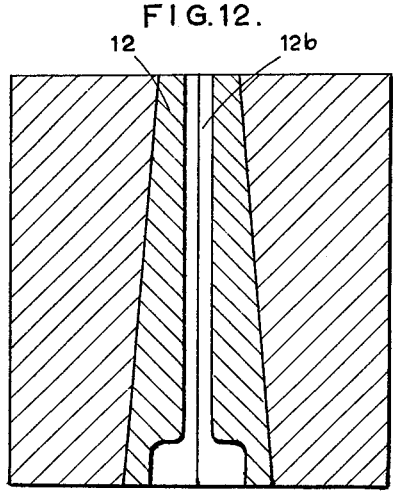
Figure 12 is a section through a die used for the second extrusion.

The holes 15 are then filled with a filler material which can be mild steel containing less than 0.1% carbon and the billet again extruded through a die 12 shaped as shown in Figure 12.

Figure 4:
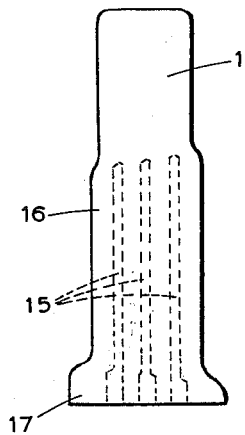
Figure 4 is an elevation of the billet after the second extrusion.

The cross-sectional area of the passage 12a in the die 12 is greater than the cross-sectional area of the corresponding passage 11a in the die 11. Consequently the first extruded portion 12 of the billet passes into the passage 12 without change but a further portion 16, see Figure 4, is extruded to approximately the desired shape of the blade profile portion. A small end portion 17 is left unextruded.

The holes 15 are, during the second extrusion, formed to substantially elliptical cross-section as described in the co-pending U.S.A. application Serial No. 689,440 of N. H. Kent and G. O. Eccles, but nevertheless still terminate at the shoulder beneath the section 12, as clearly illustrated in Figure 4.

The billet now has a first extruded portion 12, from which the root will ultimately be formed, a second extruded portion 16 which will ultimately form the blade profile portion, and a third non-extruded portion 17 from which the shroud will ultimately be formed.

Figure 5:
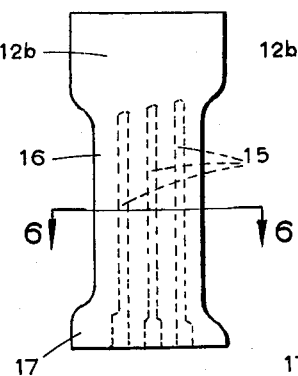
Figure 5 is an elevation of the billet after the first-extruded portion has been upset.
Figure 7:
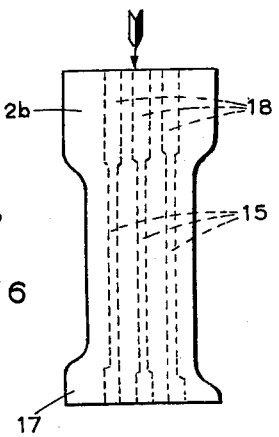
Figure 7 is an elevation of the billet after holes have been drilled in the upset first-extruded portion.
Figure 6:
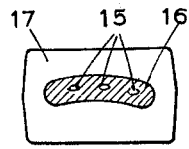
Figure 6 is a section on line 6—6 of Figure 5.
Figure 8:
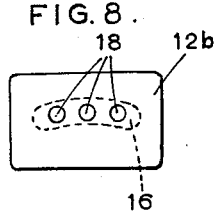
Figure 8 is an end elevation in the direction of arrow 8 in Figure 7.

The first extruded portion 12, which is unperforated, is now upset to the shape shown at 12b in Figure 5 preparatory to machining the root. Holes 18 are drilled in the upset portion 12b to register with holes 15 to form through passages for the flow of a cooling fluid for cooling the blade, as shown in Figures 7 and 8.

The depth to which the holes 18 should be drilled is clearly defined by the shoulder at the junction of the part 12b and 16 which is correspondingly positioned to the shoulder between the parts 12 and 16 in Figure 4. The portion 12b is machined to form a conventional fir-tree root 19 and platform 20.

Figure 9:
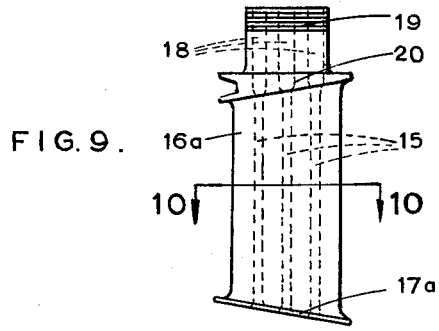
Figure 9 is an elevation of a completed blade.

The non-extruded portion 17 is then machined to form a shroud portion 17a as shown in Figure 9.

Figure 10:
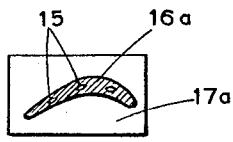
Figure 10 is a section on line 10—10 of Figure 9.

The blade profile portion 16 is machined to final shape 16a as shown in Figures 9 and 10, and the filler material is then removed from the holes 15. The filler material may be mild steel rods and may be dissolved out in nitric acid to which a wetting agent has been added.

The twist in the profile portion of the blade can be imparted during the extrusion or in a separate operation.

I claim:

1. The method of manufacturing a blade of an internal combustion turbine engine having an integral root portion, a blade profile and a shroud portion with passage ways for heat exchange fluid extending axially through the blade which method comprises the following steps:

(a) producing a billet from an alloy resistant to high temperatures;

(b) extruding in a die a solid substantially aerofoil section at one end of the billet;

(c) drilling blind holes axially in the non-extruded portion of the billet, the holes extending substantially to the plane of the junction of the extruded and non-extruded portions of the billet;

(d) inserting a filler material having deformation characteristics similar to those of the billet, such as mild steel, into the holes;

(e) extruding a further portion of the billet, adjacent the first extruded portion, in a die of greater cross-sectional area than the first die so as to leave the first extruded portion unaffected and to form an adjacent blade profile portion, again leaving an end portion of the billet non-extruded;

(f) upsetting the first-extruded portion to enlarge its cross-section laterally beyond that of the second extruded portion;

(g) machining the upset first-extruded portion to form the root of the blade;

(h) drilling holes axially through the first extruded portion to register with the blind holes and thereby form through passages;

(i) machining the non-extruded end portion to form the blade shroud;

(j) removing the filler from the holes.

2. The method claimed in claim 1 in which steps (a) and (b) are carried out at the same time the billet and section being extruded together.

3. The method claimed in claim 1 in which the blade section is twisted the twisting being carried out between steps (e) and (f).

4. The method claimed in claim 1 in which the blade section is twisted the twisting being carried out as part of step (e) the twisting being effected in the extrusion die.

References Cited in the file of this patent

UNITED STATES PATENTS

| | | |
|---|---|---|
| 2,013,622 | Bedford et al. | Sept. 3, 1935 |
| 2,047,555 | Gardener | July 14, 1936 |
| 2,389,876 | Sequin | Nov. 27, 1945 |
| 2,799,918 | Goldthwaite et al. | July 23, 1957 |
| 2,830,357 | Gunstall et al. | Apr. 15, 1958 |
| 2,836,884 | Graham | June 3, 1958 |

FOREIGN PATENTS

| | | |
|---|---|---|
| 569,514 | Great Britain | May 28, 1946 |
| 664,614 | Great Britain | Jan. 9, 1952 |
| 775,610 | Great Britain | Aug. 22, 1956 |